United States Patent [19]
Miller et al.

[11] Patent Number: 4,488,521
[45] Date of Patent: Dec. 18, 1984

[54] MONITORING MEANS FOR COMBUSTION ENGINE ELECTRIC STORAGE BATTERY MEANS

[75] Inventors: Gerald K. Miller, Hersey; Robert E. Taylor, Cadillac; Norman A. Rautiola, Reed City, all of Mich.

[73] Assignee: Nartron Corporation, Reed City, Mich. ; a part interest

[21] Appl. No.: 215,636

[22] Filed: Dec. 12, 1980

Related U.S. Application Data

[62] Division of Ser. No. 939,495, Sep. 5, 1978, Pat. No. 4,306,270.

[51] Int. Cl.³ ............................................. F02N 11/10
[52] U.S. Cl. ...................... 123/179 BG; 123/179 B; 290/38 R; 320/48; 340/636; 361/93
[58] Field of Search ........ 123/179 B, 179 BG, 179 R; 361/90, 91, 92, 93, 94, 187; 320/48; 340/636, 662, 663, 664; 290/38 R

[56] References Cited

U.S. PATENT DOCUMENTS

| | | | |
|---|---|---|---|
| 3,078,410 | 2/1963 | Thomas | 361/92 |
| 3,180,997 | 4/1965 | Short et al. | 123/179 BG |
| 3,311,907 | 3/1967 | Teal | 361/90 |
| 3,474,296 | 10/1969 | Rickey | 361/92 |
| 3,505,663 | 4/1970 | Yule | 340/662 |
| 3,585,453 | 6/1971 | Kawai | 361/91 |
| 3,657,603 | 4/1972 | Adams | 361/90 |
| 3,914,667 | 10/1975 | Waldron | 361/94 |
| 3,969,635 | 7/1976 | Wilke | 361/90 |

OTHER PUBLICATIONS

"Ford 1977 Car Shop Manual", vol. 3, Electrical, Sep. 1976.

*Primary Examiner*—Andrew M. Dolinar
*Attorney, Agent, or Firm*—Lon H. Romanski

[57] ABSTRACT

Disclosed, in combination, are a combustion engine, an electric storage battery, an electrically powered starter motor for at times driving the engine in order to start the engine, and an electrical system monitor; the electrical system monitor has a first monitoring portion which senses the actual voltage across the battery and a second monitoring portion which monitors the current through the battery; an electrical switch controls associated circuitry and is actuatable into open or closed conditions; whenever the first monitoring portion senses a preselected magnitude of the actual voltage across the battery or the second monitoring portion senses a preselected magnitude of the current flow through the battery, the electrical switch is actuated.

10 Claims, 10 Drawing Figures

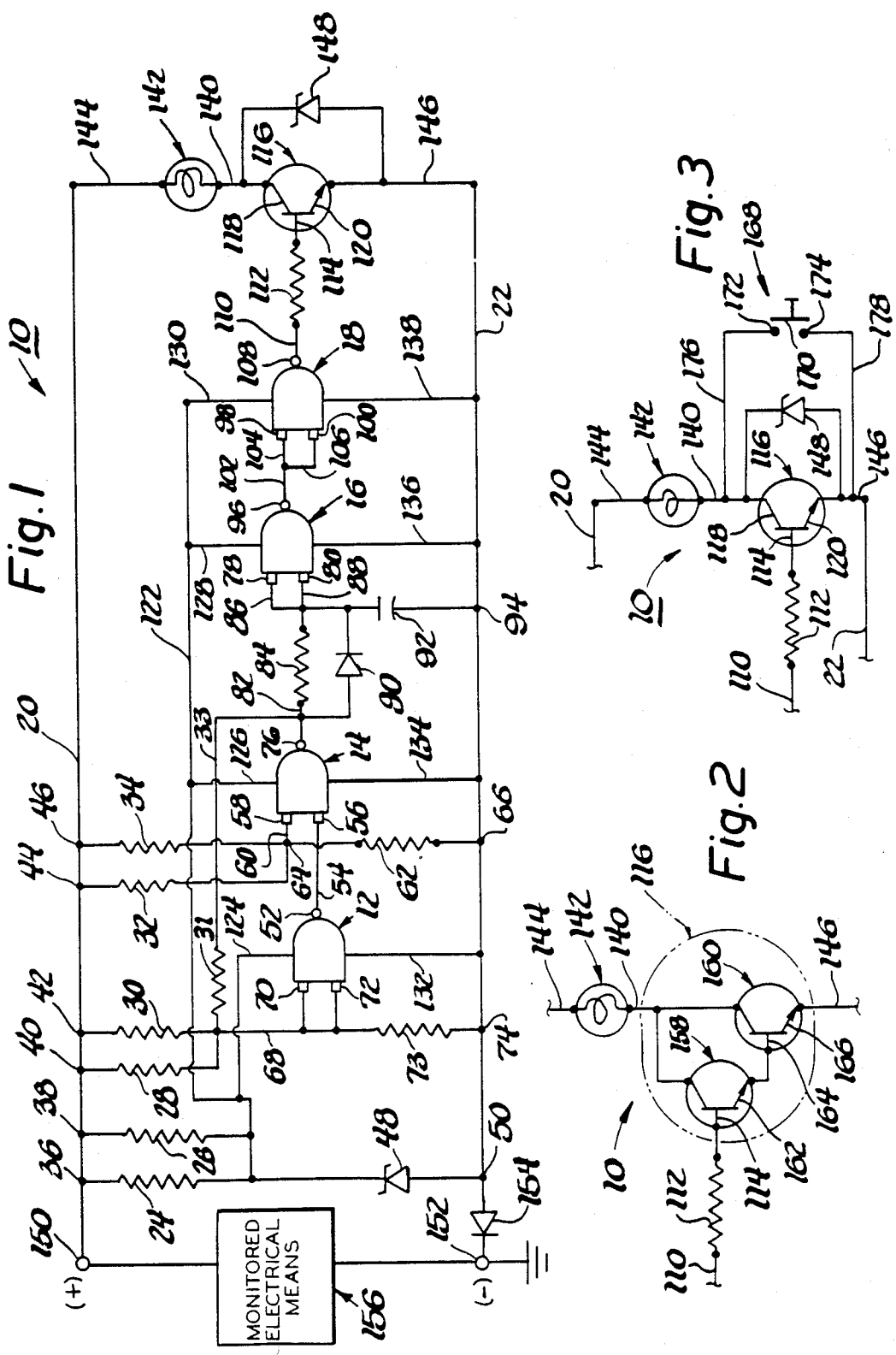

MONITORING MEANS FOR COMBUSTION ENGINE ELECTRIC STORAGE BATTERY MEANS

This is a division of application Ser. No. 939,495, filed Sept. 5, 1978, now U.S. Pat. No. 4,306,270.

BACKGROUND OF THE INVENTION

In many types of vehicles, both marine craft and land based vehicles, combustion engines are employed as motive power plants. Such engines, in turn, are usually divided into two broad catagories: (a) those in which ignition of the fuel is achieved by use of continuous or timed igniters (spark plugs or the like) and (b) those in which ignition of the fuel is achieved by causing the fuel to reach ignition temperature through sufficiently high compression of the fuel (as in diesel engines). Generally, such engines employ electrically driven engine starter motors for initially cranking and starting the engines after the engines have been shut-down. The energy for driving such starter motors is, in turn, provided from electical storage battery means carried by the respective vehicles. Further, such storage battery means are also usually employed, during engine cranking and starting, as the source of the electrical energy for the associated ignition system. In diesel engine applications, glow plugs are employed for initially creating the ignition of the fuel since, at that time, the rate of heat transfer through the cylinder walls is too great to enable, merely by compression, the development of a temperature of a magnitude sufficient to cause fuel ignition. In such installations, the storage battery means usually provides the electrical energy for heating the glow plugs for engine starting.

Further, in many of such vehicles, electrical generators (some referred to as alternators) are driven by the vehicular engine for both charging the storage battery means and to supply electrical energy to other accessories in and about the vehicle. In many of such arrangements, the output of the electrical generating means decreases significantly at relatively low engine speeds and consequently, as at curb idle engine operation, it is not unusual for such generating means to be incapable of providing all of the electrical energy required by the accessories then in use and, at such time, the remainder of the required or demanded electrical energy is supplied by the storage battery means.

Accordingly, it can be seen that it is very important to maintain the storage battery means charged to a particular potential as to thereby be assured that the storage battery means will have the required energy level when demand is placed thereon. This becomes especially important in winter when very cold ambient temperatures significantly reduce the effectiveness of the storage battery means.

As an attendant consideration, where vehicular engine driven electrical generating means are employed for charging the storage battery means, it becomes important that the generating means actually charge the storage battery means. In this connection, it becomes important that the generating means apply a charging voltage which is sufficiently high and yet not too high since a resulting excessive charging rate can damage both the storage battery means as well as other attendant electrical system components.

The same general problems and considerations also apply to the electrical current in that excessive current as well as insufficient current magnitudes can be either or both an indication of a problem occurring within the circuit in question or the cause of damage to related components and circuitry.

Accordingly, the invention as herein disclosed and described is primarily directed to the sensing of the electrical condition of storage battery means and the output of a generating system as well as other related and attendant problems. However, as will become more apparent, even though the problems described arose in a particular field or art, the invention is not so limited and may be employed in differing fields or arts.

SUMMARY OF THE INVENTION

According to one aspect of the invention, a voltage monitor for monitoring the magnitude of the voltage as across two points of reference in a monitored electrical circuit comprises first electrical conductor means, second electrical conductor means, said first and second electrical conductor means when respectively electrically connected to first and second of said two points of reference being effective for having a sensed voltage therebetween of magnitude reflective of the monitored voltage between said two points of reference, and means responsive to said sensed voltage and effective upon said sensed voltage attaining either a preselected relatively high magnitude or a preselected relatively low magnitude for actuating related switching means.

According to an other aspect of the invention, a current monitor for monitoring the magnitude of the current through a monitored electrical circuit comprises current flow sensing means effective for sensing the magnitude of said monitored current through said monitored electrical circuit and creating an output signal in response thereto, and means responsive to said output signal and effective upon said output signal indicating the existance of a preselected relatively high magnitude or a preselected relatively low magnitude of monitored current flow for actuating related switching means.

In still another aspect of the invention a voltage monitor for monitoring the magnitude of the voltage as across two points of reference in a monitored electrical circuit comprises first electrical conductor means, second electrical conductor means, said first and second electrical conductor means when respectively electrically connected to first and second of said two points of reference being effective for having a sensed voltage therebetween of a magnitude reflective of the monitored voltage between said two points of reference, first means responsive to said sensed voltage and effective upon said sensed voltage attaining either a preselected relatively high magnitude or a preselected relatively low magnitude for actuating related switching means, current flow sensing means effective for sensing the magnitude of the current flow through said electrical circuit and creating an output signal in response thereto, and second means responsive to said output signal and effective upon said output signal indicating the existance of a preselected relatively high magnitude or a preselected relatively low magnitude of monitored current flow for actuating related switching means.

Other general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views:

FIG. 1 is a schematic wiring diagram of apparatus employing teachings of the invention;

FIG. 2 is a fragmentary portion of a schematic wiring diagram illustrating a modification of the invention as shown in FIG. 1;

FIG. 3 is a fragmentary portion of a schematic wiring diagram illustrating a further modification of the invention as shown in FIG. 1;

DETAILED DESCRIPTION OF THE PREFERRED EMBODIMENT

Figure 4:
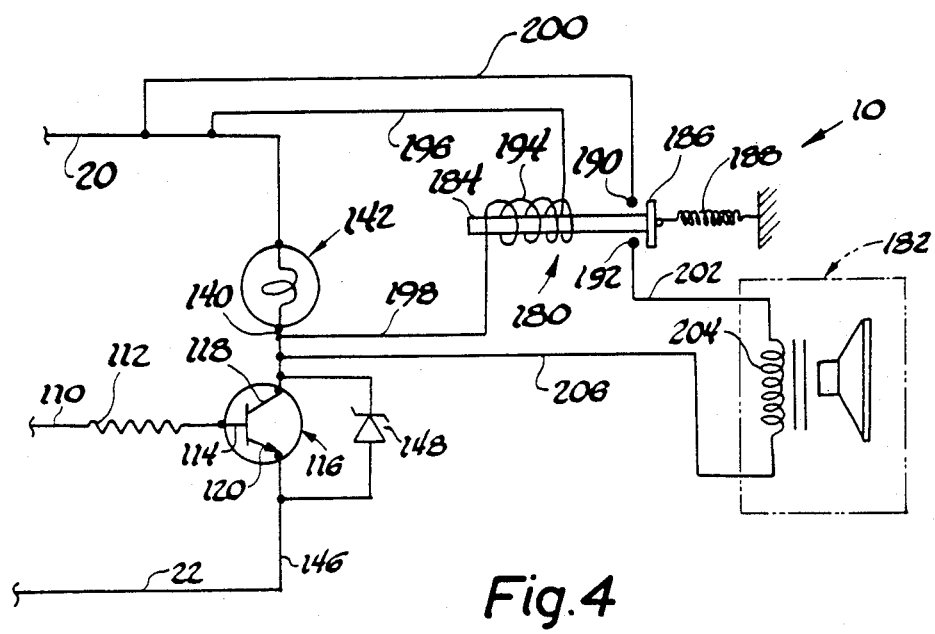
FIG. 4 is a fragmentary portion of a schematic wiring diagram illustrating yet another modification of the invention as shown in FIG. 1.

Referring now in greater detail to the drawings, FIG. 1 illustrates circuitry 10 as comprising a plurality of C-MOS type integrated circuit gates 12, 14, 16 and 18, a main electrical conductor means 20 and a main electrical conductor means 22. A plurality of resistance means 24, 26, 28, 30, 32 and 34 have their respective one ends electrically connected to conductor means 22 as at 36, 38, 40, 42, 44 and 46. The other electrical ends of resistance means 24 and 26 are electrically connected to one electrical end of a zener diode 48 which, in turn, has its other electrical end electrically connected to conductor means 22 as at 50.

The output terminal 52 of gate 12 is electrically connected via conductor means 54 to an input terminal 56 of gate 14. The other input terminal 58 is electrically connected as by conductor means 60 to the resistance means 32 and 34. As illustrated, additional resistance means 62 is connected at one end, as at 64, to resistors 32 and 34 and input terminal 58 and, at its other end electrically connected to conductor means 22 as at 66. As should be apparent, resistors 32 and 34 along with resistor 62 effectively describe and define voltage divider means operatively connected to input terminal 58.

With regard to gate 12, the other ends of resistors 28 and 30 are electrically connected, as through conductor means 68 to both input terminals 70 and 72 of gate 12 as well as through series resistor means 73 to conductor 22 as at 74. As should be apparent, resistors 28 and 30 along with resistor 73 effectively describe and define voltage divider means operatively connected to input terminals 70, 72 of gate 12. Also, resistors 28 and 30 are connected as by conductor means 33 and series resistance means 31 to conductor means 82 and output terminal 76 of gate 14. The resistance means 31, by being, effectively, electrically connected from the output 76 of gate 14 to the inputs 70, 72 of gate 12, serves to function as hysteresis generating means serving to prevent the occurrence of an unstable condition as at the output 76 of gate 14.

The output terminal 76 of gate 14 is electrically connected to both input terminals 78 and 80 of gate 16 as through conductor means 82, series resistance means 84 and branch conductors 86 and 88. A diode 90 is placed in parallel with resistance means 84 and capacitor means 92 is also provided as to have one electrical side thereof at a potential generally that of inputs 78 and 80, and the other electrical side thereof connected as to conductor means 22 as at 94.

The output terminal 96 of gate 16 is electrically connected to both input terminals 98 and 100 of gate 18 as by conductor means 102 and branch conductor means 104 and 106, while the output terminal 108 of gate 18 is connected as through conductor means 110 and series resistance means 112 to the base terminal 114 of a transistor 116 having a collector terminal 118 and an emitter terminal 120.

A conductor means 122, leading as from the electrical juncture of resistors 24, 26 and zener diode 48, supplies positive voltage potential to gates 12, 14, 16 and 18 as through branch circuit portions 124, 126, 128 and 130, while additional circuit portions 132, 134, 136 and 138, each connected to conductor means 22, serve to complete the power circuits to each of such gates 12, 14, 16 and 18.

Collector 118 is connected as to conductor means 140 leading as to one electrical side of related electrical load means 142 which, in turn, is electrically connected at its other electrical side to conductor means 20 as by conductor means 144. In the embodiment shown, the load means 142 comprises electrically energizable lamp or indicator light means thus, as will become more apparent, providing for at least one form of sensory warning means. The emitter 120 is electrically connected, as by conductor means 146, to conductor 22. Preferably, a zener diode 148 is placed in parallel with the collector-emitter circuit of transistor means 116 as by connection to conductor means 140 and 146.

As also depicted, preferably, conductor means 20 and 22 are respectively provided with terminal means 150 and 152 and diode means 154 is preferably provided, in circuit with conductor 22, as between terminal 152 and the remaning portion of the circuitry described.

OPERATION OF INVENTION

In FIG. 1, the diagrammatically illustrated monitored apparatus 156 can be any desired portion of circuitry to be monitored or actual apparatus as, for example, storage battery means or electrical generating means. For purposes of discussion, let it be assumed that 156 is a storage battery and that terminal 150 is electrically connected to the positive (+) terminal or side of the battery while terminal 152 is electrically connected to the negative (−) terminal or side of the battery.

Further, for purposes of discussion, let it be assumed that the monitored battery 156 is one which when ideally fully charged would exhibit 12.8 volts across its terminals and it is desired to know when the battery terminal voltage increases to, for example, 15.5 volts and when such battery terminal voltage decreases to, for example, a value less than 10.0 volts.

Now, let it be assumed that the battery 156, as for example, by overcharging by related generating means, exhibits a terminal voltage of 15.5 volts. At the time that such battery terminal voltage increases to and attains 15.5 volts, the input terminals 70 and 72 of gate 12 have a relatively "high" signal applied thereto. Whenever the input signals on both input terminals 70 and 72 of gate 12 are "high", the resulting signal at the output terminal 52 of gate 12 is relatively "low". The "low" signal from output 52 is applied, via conductor means 54, as an input signal to input terminal 56 of gate 14. However, a relatively "high" signal is applied to input terminal 58 of gate 14. As a consequence of one of the input terminals of gate 14 being "low" and the other input terminal being "high" the signal at output terminal 76 of gate 14 is "high" and such "high" signal value is applied as by conductor means 82, 86 and 88 to both input terminals 78 and 80 of gate 16 resulting in the signal at the output terminal 96 of gate 16 being "low". The "low" output signal of terminal 96 is then applied to both input terminals 98 and 100 of gate 18 thereby causing the signal at output terminal 108 to be "high".

The "high" output signal of gate 18, applied via conductor means 110 and resistor means 112 to base terminal 114 of transistor 116 is sufficient to place transistor 116 into conduction, or turn transistor 116 "on", thereby causing current flow through load or lamp means 142 and the collector-emitter circuit of transistor 116. The thusly energized light or lamp means 142 provides a sensory signal that the monitored apparatus 156, in this instance assumed to be a storage battery, has attained or exceeded a preselected electrical voltage potential as across the monitored portion thereof. In this assumed state, the indicator means 142 will remain energized for so long as the assumed over-voltage condition exists. Now let it be assumed that the monitored battery terminal voltage has decreased to a value less than the assumed 15.5 volts (as for example the nominally ideal charged voltage of 12.8 volts). At the instant the battery terminal voltage becomes less than the assumed 15.5 volts, the input signals at input terminals 70 and 72 become "low" resulting in output signal of gate 12 being "high". The "high" gate 12 output signal is applied to input terminal 56 of gate 14 and along with the input signal on input terminal 58 which remains "high" cause the resulting signal at output terminal 76 to be "low". Consequently, the signal at both input terminals 78 and 80 of gate 16 are "low" resulting in the signal at output terminal 96 of gate 16 being "high" which, applied to both input terminals 98 and 100 of gate 18 causes the signal at output terminal 108 to be "low". The "low" output signal applied to the gate or base terminal 114 of transistor 116 causes the transistor 116 to be taken out of conduction, or turned "off", resulting in the de-energization of indicator means 142. The de-energization of the indicator means 142, in the preferred embodiment of the invention and under the assumed conditions, would indicate that the magnitude of the monitored voltage is within a preselected acceptable range of magnitudes.

Now let it be assumed that the battery 156, as for example, by excessive discharging, exhibits a terminal voltage of 10.0 volts. At the instant that such battery terminal voltage decreases to and attains the assumed 10.0 volts, the input terminals 70 and 72 of gate 12 remain at a relatively "low" input signal thereby maintaining the signal at output of gate 12 at "high" which continues to be applied as a "high" input signal to input terminal 56 of gate 14. However, at this instant, the value of the input signal at input terminal 58 of gate 14 changes from "high" to "low" with the result that the signal at output terminal 76 of gate 14 now becoming "high".

The "high" output of gate 14 applied to both input terminals 78 and 80 of gate 16 causes the signal at output terminal 96 of gate 16 to be "low" which, applied to both input terminals 98 and 100 of gate 18, causes the output at 108 of gate 18 to be "high". As previously described, the "high" output at 108, applied to base terminal 114, causes transistor 116 to be turned "on" thereby energizing the indicator means 142 which will continue to be energized for so long as the assumed under-voltage condition exists.

As is apparent, the invention has, generally, three states which it is sensitive and responsive to. That is, the first condition is that which may be referred to as a normal or acceptable range of magnitudes of monitored voltage; the second condition is that which may be referred to as a range of magnitudes of monitored voltage in excess of the acceptable range; and the third condition is that which may be referred to as a range of magnitudes of monitored voltage less than the acceptable range.

Further, it is contemplated that additional time delay means may be provided. For example, resistor means 84 and capacitor means 92 comprise an R-C or time delay circuit. Whenever, the circuitry is in a state resulting in the energization of indicator or load means 142, the output terminal 76 of gate 14 will be "high" causing capacitor 92 to become charged. Subsequently, whenever the monitored voltage changes as to cause terminal 76 of gate 14 to change from "high" to "low" (as previously described) the charged capacitor 92 discharges through resistor 84 and gate 14 thereby, while discharging, maintaining the signals at input terminals 78 and 80 at "high". Consequently, the circuitry to the right of (as viewed in FIG. 1) and including gate 16 continues to function as if the magnitude of the monitored voltage is beyond the previously referred-to range of acceptable magnitudes thereby maintaining the load or indicator means 142 energized. When capacitor means 92 sufficiently discharges, the values of the signals at input terminals 78 and 80 become "low" at which time the circuitry to the right of (as viewed in FIG. 1) and including gate 16 switches to function to reflect that the magnitude of the monitored voltage is within the previously referred-to range of acceptable magnitudes. Consequently, as also previously described, the indicator or load means 142 becomes de-energized. The time delay can be made to provide any desired span of time delay. In one successful embodiment of the invention, a time delay in the order of 6.0 seconds was employed.

The resistance means indicated as being separate resistors 24 and 26 may, in fact, be single resistance means equivalent to the separately illustrated resistors 24 and 26. The same, of course, applies to each parallel pair of resistors 28, 30 and 32, 34. Further, it is contemplated that any or all of resistor pairs 24, 26; 28, 30 and 32, 34 may be replaced as by variable resistor means thereby enabling such to be selectively adjusted to produce any desired resulting voltage drop and thereby select the overall range of acceptable magnitudes of monitored voltage. Also, it is contemplated that in circuitry as shown in FIG. 1, for example, resistors 30 and 34 may be selected as to provide a standard basic value of resistance and that resistors 28 and 32 would each be selected as to provide the further required and desired value of resistance as to result in particular total values of resistance which would, in turn, provide for a desired resulting range of acceptable magnitudes of monitored voltage. This might be of benefit especially where high volume production of the invention is desired; that is, all of the components could be standardized and "trim" type resistors selected, as for resistance means 28 and 30, to provide for a particular range of acceptable magnitudes of monitored voltage with which the invention will be employed.

As also should now be apparent, the zener diode 48 and resistors 24, 26 define a regulated voltage supply for powering the gate means 12, 14, 16 and 18. Diode means 154 provides protection as against stray reverse polarity pulses which might be applied as to terminal means 152 from any associated circuit means. Also, zener diode 148 serves to protect the collector-emitter circuit of transistor means 116 from any possible over-voltage condition which might otherwise exceed the capacity of transistor means 116.

As indicated in FIG. 2, wherein elements like or similar to those of FIG. 1 are identified with like reference numbers, it is also contemplated that the transistor means 116 may in fact comprise Darlington circuitry comprised of transistors 158, 160 with the collectors of each being electrically connected to conductor means 140 and the emitter 162 of transistor 158 being connected to the base 164 of transistor 160 which has its emitter 166 connected to conductor means 146.

In one particularly successful embodiment of the invention, the following elements had the respectively indicated values:

| | | |
|---|---|---|
| Resistor 24: | ¼watt; | 560 ohms |
| Resistor 26: | ¼watt; | 560 ohms |
| Resistor 28: | ¼watt; | 39K. |
| Resistor 30: | ¼watt; | 18K. |
| Resistor 31: | ¼watt; | 100K. |
| Resistor 32: | ¼watt; | 39K. |
| Resistor 34: | ¼watt; | 18K. |
| Resistor 62: | ¼watt; | 5.6K. |
| Resistor 73: | ¼watt; | 3.3K. |
| Resistor 84: | ¼watt; | 2.0 Meg. |
| Resistor 112: | ¼watt; | 10.0K |

Gates 12, 14, 16 and 18 were actually comprised of a type MC14011CP, quad 2-input "NAND" gate, manufactured by Motorola Semiconductor Products, Inc. and described in the publication entitled "The Semiconductor Data Library, Series A, Volume V" and bearing a U.S. of America copyright notice by Motorola, Inc., 1975; transistor means 116 was type MPSA13 manufactured by Motorola Semiconductor Products, Inc. and described in the publication entitled "The Semiconductor Data Library, Series A, Volume 3" and bearing a U.S. of America copyright notice by Motorola, Inc., 1974; zener diode 148 was type IN4750, 27 volts; zener diode 48 was type IN5231, 5.1 volts; diode 90 was type IN4001; diode 154 was type IN4001 and capacitor 92 was 22 μf.

FIG. 3 illustrates another contemplated embodiment of the invention. All elements in FIG. 3 which are like or similar to FIGS. 1 and/or 2 are identified with like reference numbers. The embodiment of FIG. 3 contemplates the provision of normally open push-button type, or the like, switch means 168 situated in parallel with transistor means 116 as to thereby enable selective testing of the indicator means 142. Switch means 168 may comprise a normally open push-close type switch contact 170 which is movable towards and against spaced fixed contacts 172 and 174 which, in turn, are respectively electrically connected to conductor means 140 and 146 as through related conductors 176 and 178. If the load means 142 is in an un-energized state and it is desired to test it to see if it is operative, all that needs to be done is to push contact 170 against contacts 172 and 174 thereby completing the circuit therethrough and through load 142. If load 142 becomes energized, it is operative; if it does not become energized, it is inoperative.

FIG. 4 illustrates another contemplated embodiment of the invention. All elements in FIG. 4 which are like or similar to those either FIGS. 1, 2 or 3 are identified with like reference numbers. The embodiment of FIG. 4 contemplates the provision of other or additional load, indicator or output means. That is, it is contemplated that additional output means such as at 180 may be provided whereby it becomes possible to actuate or control related means in response to the circuitry sensing, for example, that the magnitude of the monitored voltage is beyond the range of acceptable magnitudes of voltage. In the example shown in FIG. 4, such related means is depicted as auditory warning means 182. More specifically, output means 180 may comprise a normally open solenoid switch having an armature 184 operatively connected to a movable switch member 186 which a spring 188 normally maintains in an open position with respect to fixed contacts 190 and 192. A field coil or winding 194 has one electrical end connected to conductor 20, as by conductor means 196, and its other electrical end connected to conductor means 140, as by conductor means 198. Similarly, fixed contact 190 is electrically connected to conductor means 20 as by a conductor means 200 while contact 192 is electrically connected via conductor means 202 to one end of the actuating coil 204 of the buzzer or auditory device 182. The other end of coil 204 is electrically connected via conductor means 206 to conductor 140.

Accordingly, in the embodiment of FIG. 4 whenever transistor means 116 is turned "on", field coil 194 is energized causing contacts 190 and 192 to be closed by switch member 186 thereby closing the circuit through conductors 200, 202 and 206 resulting in the energization of related output means, in this instance auditory signal generating means 182.

It should, of course, be apparent that the circuitry of FIG. 1 could be modified by the addition thereto of any or all of the modifications disclosed by FIGS. 2, 3 and 4. Further, it should be made clear that in each of FIGS. 2, 3 and 4 only that much of the circuitry shown in FIG. 1 has been shown as is believed necessary in order to illustrate the manner of accomplishing the particular contemplated modification.

Figure 5:
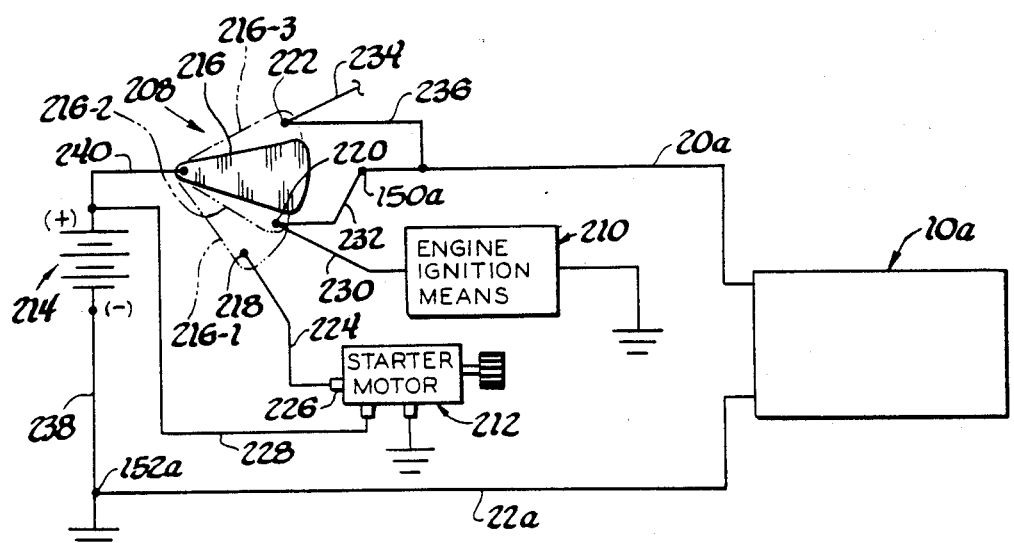
FIG. 5 is a somewhat simplified schematic and diagrammatic illustration of the invention employed in a particular environment.

In FIG. 5, those elements which are like or similar to those of any of FIGS. 1, 2 or 3 are identified with like reference numbers provided with a suffix "a". FIG. 5 illustrates the circuitry of the invention, 10a, employed in combination with or in the environment of a combustion engine which, in turn, may have an operator controlled ignition switch assembly 208, engine ignition means 210 and an engine starter motor assembly 212 with associated storage battery means 214.

The ignition switch assembly 208, which may be of the type conventionally operated with a key, is illustrated as comprising a pivotal or rotatable switch contact 216 which is selectively movable to a first position, partially depicted at 216-1; a second position partially depicted at 216-2; and to a third position partially depicted at 216-3. Three relatively fixed contacts 218, 220 and 222 are so positioned as to be selectively engaged by switch contact 216. When contact 216 is in the position shown in solid line, none of the contacts 218, 220 and 222 is engaged thereby.

Contact 218 is illustrated as being electrically connected as by conductor means 224 to an actuating or switching solenoid assembly 226 of the starter motor 212 which may have its main electrical power, for cranking the related engine, supplied as by conductor means 228.

Contact 220 is illustrated as being electrically connected to related engine ignition means 210 as by conductor means 230 and connected to terminal 150a of conductor means 20a as by conductor means 232.

Contact 222 is illustrated as being electrically connected to conductor means 234, leading as to non-engine related vehicular accessories, and to conductor means 20a via conductor means 236.

As illustrated, switch contact 216 is connected to conductor means 240 leading as to the positive (+) terminal of battery means 214 while the negative (−) terminal of battery means 214 is electrically connected, via conductor means 238 to terminal 152a of conductor means 22a. When switch contact member 216 is moved to its position at 216-1 both contacts 218 and 220 are engaged by switch member 216 thereby completing circuits from the battery means 214 through: (a) the engine ignition means 210; (b) the starter motor solenoid switch 226 and (c) circuitry 10a. As a consequence, starter motor 212 cranks the engine for starting thereof while the engine ignition means provides the required energy for affecting fuel ignition. Once the engine is started, the switch member 216 is moved to its position at 216-2 thereby de-energizing the starter motor 212. It should be noted that when switch member 216 is in either of its positions 216-1 or 216-2 that the circuit through the circuitry 10a of the invention is closed. Therefore, if the indicator means 142 is energized at that time (with switch member 216 in either 216-1 or 216-2) it will be an indication that the magnitude of the voltage monitored by circuit means 10a is beyond the limits established as being the range of acceptable magnitudes of voltage. If it is assumed that the engine is started, switch member 216 is in its position 216-2 and the indicator means 142 is still energized, if at that time the speed of the engine is increased and the indicator means 142 becomes de-energized, it would be an indication that the associated electrical generating means is not producing a sufficient output for the relatively slower engine speeds. The vehicle operator would then be made aware that possibly the drive belt means, as between the engine and associated electrical generating means, is not functioning properly or that the electrical generating means itself has experienced a degree of failure. Further, it should be apparent that the vehicle operator may well check the state or charge of the battery 214 prior to engine cranking simply by moving the switch member 216 to either of its positions 216-2 or 216-3. If at this time the indicator means 142 becomes energized, the operator will know that the charge on the battery is below acceptable limits and the operator may want to take precautionary steps, especially in winter, prior to attempting engine cranking as, for example by, applying some relatively highly volatile starting fluid into the engine induction passage means prior to engine cranking.

Figure 6:
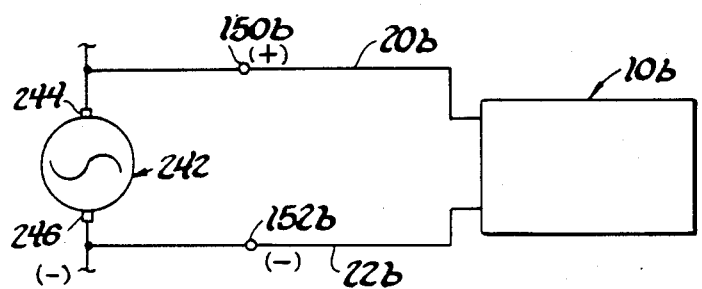
FIG. 6 is a somewhat simplified schematic and diagrammatic illustration of the invention employed in another environment.

In FIG. 6, those elements which are like or similar to those of any of FIGS. 1, 2 or 3 are identified with like reference numbers provided with a suffix "b". FIG. 6 illustrates the circuitry of the invention, 10b, employed with or in the environment of electrical generating means 242 which, for example, may be of a stationary type or employed in a vehicle and driven by the vehicular engine for supplying electrical energy as, for example, the vehicle engine and/or vehicular accessories. In vehicles, such generating means may be referred to as either generators or alternators and even though there are some differences between "generators" and "alternators" they are functionally the same in that each is employed to produce a voltage and current. Often the term, generator, is employed generically for both a "generator" and "alternator". In any event, in FIG. 6, the circuitry of the invention 10b is shown electrically connected as through its conductors 20b and 22b and its terminals 150b and 152b as to the output terminals 244 and 246 of generator means 242. Obviously, in the arrangement of FIG. 6 when the voltage output of generator means 242 was either less or greater than the range of acceptable magnitudes of monitored voltage, the indicator means would be energized. In some alternators it would be possible to connect the circuitry 10b to the alternator field in order to determine whether the field is being properly energized. In this manner it would be possible to determine whether the speed of rotation of the alternator was at a proper speed when the alternator was functioning.

Figures 7, 8:
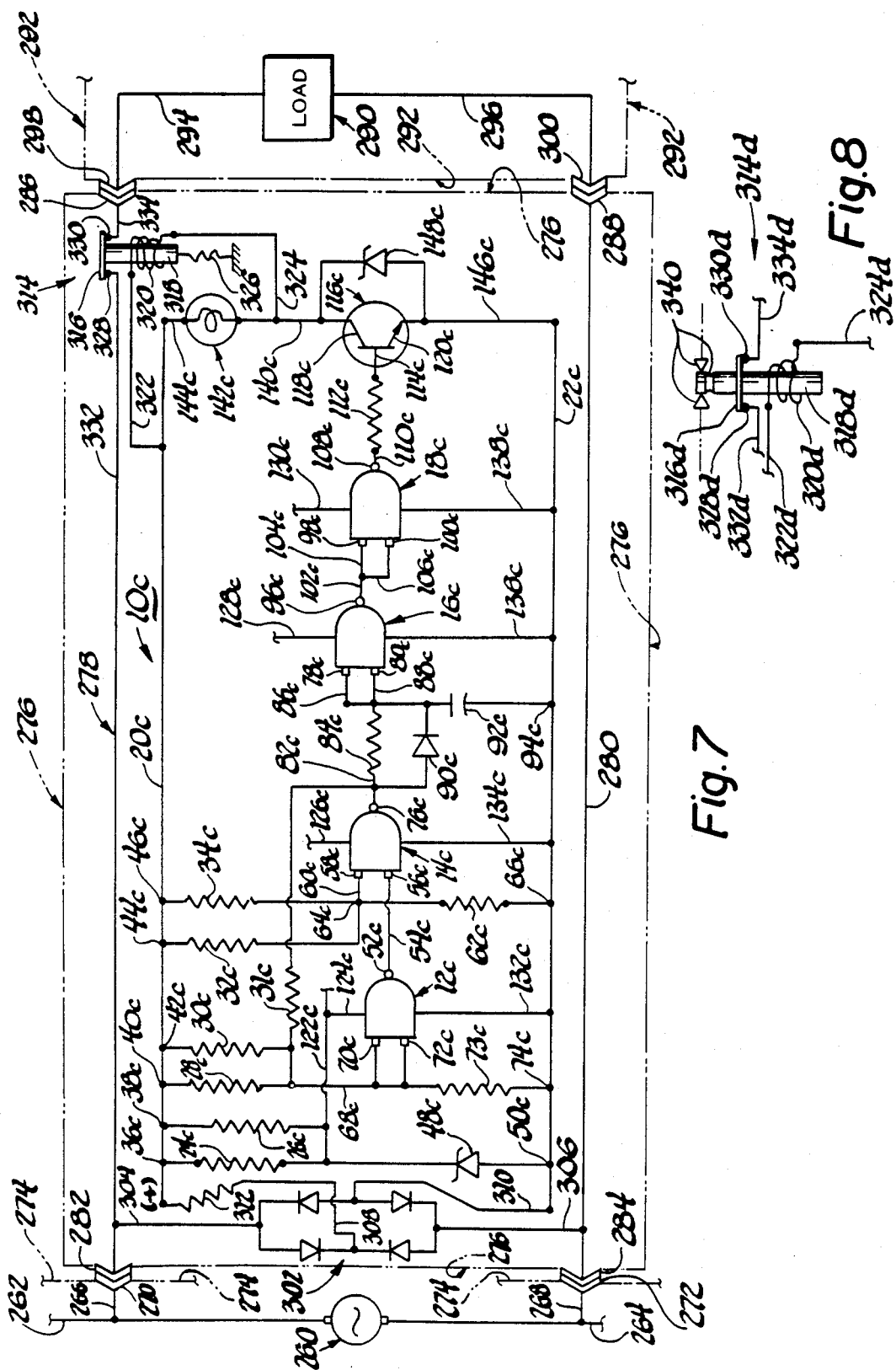
FIG. 7 is a schematic wiring diagram illustrating yet another embodiment of the invention.
FIG. 8 is a fragmentary portion of a schematic wiring diagram illustrating a further modification of the invention as shown in FIG. 7.

In FIG. 7 all elements which are like or similar to those in any of FIGS. 1, 2, 3, 4, 5 or 6 are identified with like reference numbers provided with a suffix "c".

As illustrated, circuitry as that shown in and described with reference to FIG. 1 is contained within FIG. 7. Further, the embodiment of FIG. 7 reflects and, by way of example, depicts contemplated arrangements: (a) whereby the circuitry 10c may be generally packaged as a plug-in type apparatus; (b) whereby the circuitry 10c may be employed in combination with electrical circuitry of the a.c. type; (c) whereby the packaging of circuitry 10c may be such as to also provide for power supply conductor means extending therein for, in turn, plug-in type connection with related load means situated externally of the packaging of circuitry 10c; and, among other possibilities, (d) providing switch means within the packaging of circuitry 10c for opening the circuit through the power supply conductor means in response to the monitored voltage exceeding the limits of the range of acceptable magnitudes of voltage.

In FIG. 7 a source of electrical potential is illustrated at 260 and is of the type generating an alternating current. Such could also represent a power distribution system as that for supplying electrical power to a home or manufacturing plant or the like. Conductor means 262 and 264 may represent main power supply lines with branch conductors 266 and 268 leading therefrom and to respective, for example, female type plug-in contacts 270 and 272 as may be situated within a suitable receptacle carried as by the interior of a wall of a home, a panel board or other suitable support means 274. It is contemplated that suitable housing means 276 would serve to contain circuitry 10c as well as main power supply conductor means 278 and 280. Male type plug-in contacts 282 and 284, respectively connected to conductor means 278 and 280, would be effective for respective electrical engagement with contacts 270 and 272. Female type plug-in contacts 286 and 288 are also respectively connected to conductor means 278 and 280 and supported either directly upon housing means 276 or as through cable means carried by the housing means 276.

Externally situated electrical load means 290, which may be contained as within its own associated housing means 292, has its conductor means 294 and 296 respectively connected as to male type plug-in contacts 298 and 300 which, as depicted, are connectable with contacts 286 and 288, respectively.

Suitable rectifier means 302 has its inputs respectively connected, as by conductor means 304 and 306, to main power conductors 278 and 280 while its output terminals are respectively connected, as by conductor means 308 and 310, to conductor means 20c and 22c. Conductor means 308 may comprise suitable dropping resistor means 312.

As is apparent, the rectifier means 302 functions to convert the alternating current voltage to a d.c. voltage employable within the circuitry 10c while conductor means 278 and 280 continue to supply the alternating current to the remote load 290.

In the embodiment of FIG. 7, switch means 314 is provided for, at times, opening the main power circuit leading to the load 290. Such switch means 314 is depicted as comprising a relay like assembly having a normally closed movable switch contact 316 operatively moved by an associated armature 318 which has a winding or coil 320 having one electrical end thereof electrically connected to conductor means 20c, as by conductor 322, and the other electrical end thereof connected to conductor means 140c via conductor means 324. Suitable spring means 326 may be employed for urging movable contact 316 into closed engagement with fixed contacts 328 and 330 respectively connected to segments 332 and 334 of conductor means 278.

In the embodiment of FIG. 7, the circuitry of 10c would be selected as to determine a range of acceptable magnitudes of voltage which is compatible with the load 290 even possibly narrowing such range as to thereby even provide for a safety factor. In any event when the magnitude of such monitored voltage is without such preselected range of acceptable magnitudes, indicator means 142c will become energized as will also switch means 314 thereby causing switch contact 316 to move away from contacts 328 and 330 resulting in the circuit to load 290 being opened and thereby protecting the load 290 from possible damage. In the embodiment of FIG. 7, switch means 314 will remain open for the length of time that the sensed excessive voltage deviation exists. If the time delay means 84c, 92c is employed, the switch means 314 will remain open for the additional length of time determined by such time delay means.

In FIG. 8, wherein elements like or similar to those of FIG. 7 are identified with like reference numbers provided with a suffix "d", another possible switch means 314d is illustrated. In this arrangement is contemplated that suitable detent means, diagrammatically illustrated at 340, would be provided as to retain switch member 316d open even if the magnitude of the monitored voltage should again return to within the range of acceptable magnitudes of voltage. This would require that an operator re-set switch member 314d closed thereby assuring that inspection of the overall situation could be first performed before the load 290 was again exposed to the main power supply voltage. Other switching means may, of course, be employed for performing the function of switch means 314 or 314d. For example, it is contemplated that solid state switch means such as, by way of further example, triac means may be employed.

In view of the disclosure of FIG. 7, it is apparent that the invention may be practiced equally well without the rectifier means in situations where the emf. source 260 or conductors 266, 268 provide a d.c. current.

It should also be apparent that the invention provides means whereby any particular sub-circuit can be monitored in order to continuously be aware of the operating condition of such. It is possible to provide a series of such monitoring points with individual indicating means, which upon energization, would indicate the unacceptable condition of that particular circuit portion being monitored as by different colored light (as between or among several indicator means) or as by legends respectively illuminated by the indicator means.

Figure 9:
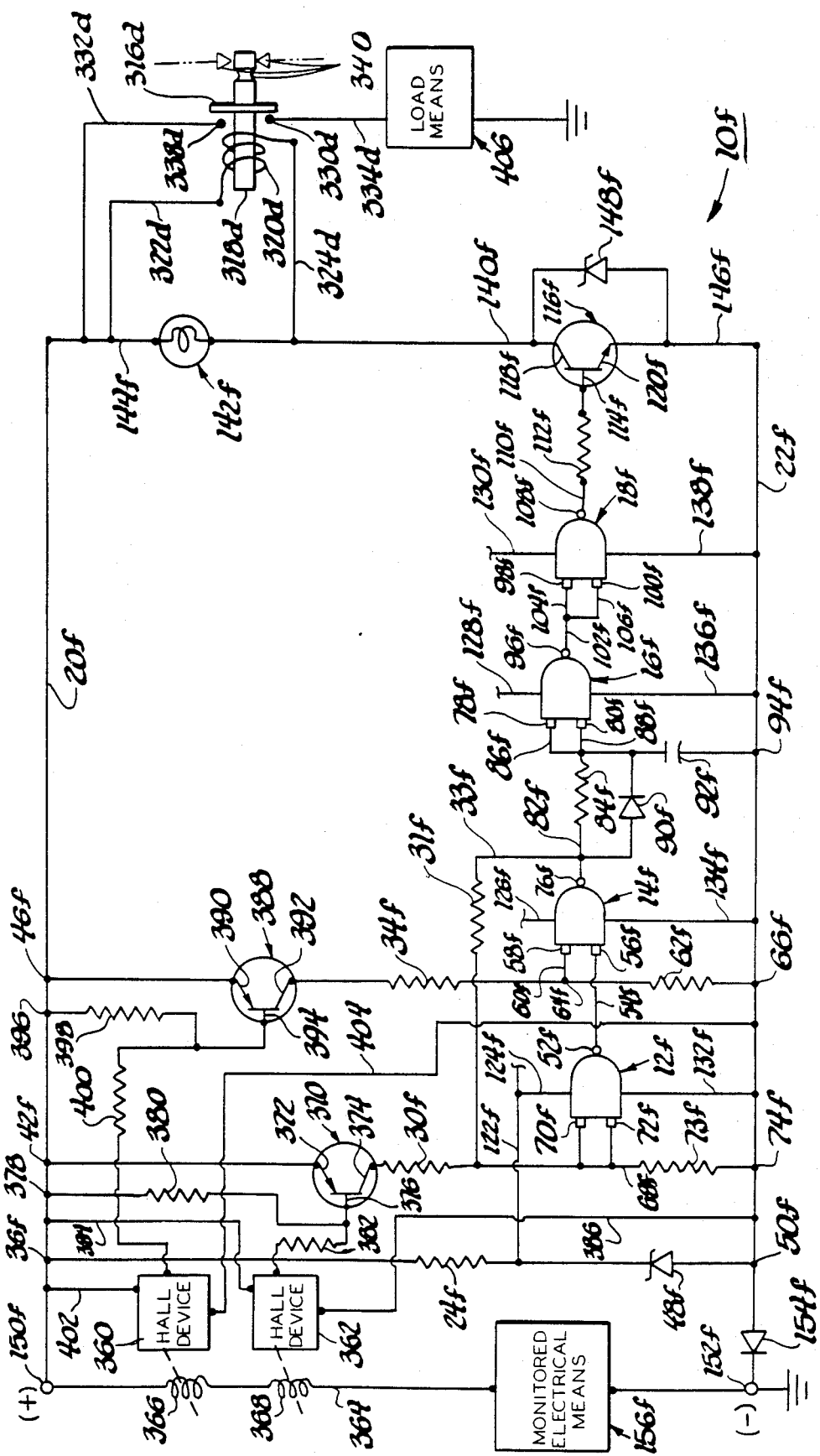
FIG. 9 is a schematic wiring diagram of still other apparatus employing teachings of the invention.

In FIG. 9 all elements which are like or similar to these in any of the preceding Figures are identified with like reference numerals provided with a suffix "f". The resistors 24f, 30f, and 34f, if desired, may be considered as the functional equivalents of pairs of resistors 24, 26; 28, 30 and 32, 34, respectively.

In FIG. 9, suitable HALL devices or means 360 and 362 are provided as in close proximity as to a portion of the monitored electrical means 156f as by, for example, placing such HALL means 360 and 362 in close proximity to a portion of a related circuit 364. As depicted, such related circuit portion 364 may be provided with inductance means 366 and 368. Generally, as is well known in the art, a HALL device or HALL effect device or means is an apparatus or device which is effective for developing a voltage as between the edges or faces of a current carrying strip, or the like, when such strip is placed in a magnetic field generally perpendicular to the faces of the strip.

As also depicted in FIG. 9, resistance means 30f is electrically connected to conductor 20f through a transistor 370 having an emitter 372, collector 374 and base terminal 376 with the emitter 372 being connected to conductor 20f as at point 42f and the base 376 being electrically connected to point 378 of conductor 20f and HALL effect device 362 as through respective resistance means 380 and 382 and associated conductor means. The HALL effect device 362 may obtain its internal power as across conductor means 20f and 22f as by means of conductors 384 and 386.

Similarly, resistance means 34f is electrically connected to conductor 20f through a transistor 388 having an emitter 390, collector 392 and base terminal 394 with the emitter 390 being connected to conductor 20f as at point 46f and the base 394 being electrically connected to point 396 of conductor 20f and HALL effect device 360 as through respective resistance means 398 and 400 and associated conductor means. The HALL effect device 360 may obtain its internal power as across conductor means 20f and 22f as by means of conductors 402 and 404.

Let it be assumed that the HALL effect device or means 362 is selected and effective to sense the occurrence of a preselected maximum or high magnitude of current flowing in the monitored circuit 364, and, let it also be assumed that such a preselected high magnitude is sensed. Further, let it be assumed that HALL effect means 360 is responsive to the occurrence of a preselected minimum or low magnitude of current flow through the monitored means 364.

Consequently, when the preselected high magnitude of current occurs, both HALL effect means 360 and 362 are turned "on" thereby causing the base 376 of transistor 370 and the base 394 of transistor 388 to become negatively baised with respect to their respective emitters 372 and 390 thereby causing each of transistors 370 and 388 to become conductive (turned "on").

At this time terminals 70f and 72f of gate 12f have a relatively "high" signal applied thereto. Whenever the input signals on both input terminals 70f and 72f of gate 12f are "high", the resulting signal at the output terminal 52f of gate 12f is relatively "low". The "low" signal from output 52f is applied, via conductor means 54f, as an input signal to input terminal 56f of gate 14f. However, a relatively "high" signal is applied to input terminal 58f of gate 14f. As a consequence of one of the input terminals of gate 14f being "low" and the other input terminal being "high" the signal at output terminal 76f of gate 14f is "high" and such "high" signal value is applied as by conductor means 82f, 86f and 88f to both input terminals 78f and 80f gate 16f resulting in the signal at the output terminal 96f of gate 16f being "low". The "low" output signal of terminal 96f is then applied to both input terminals 98f and 100f of gate 18f thereby causing the signal at output terminal 108f to be "high".

The "high" output signal of gate 18f, applied via conductor means 110f and resistor means 112f to base terminal 114f of transistor 116f is sufficient to place transistor 116f into conduction, or turn transistor 116f "on", thereby causing current flow through load or lamp means 142f and the collector-emitter circuit of transistor 116f. The thusly energized light or lamp means 142f provides a sensory signal that the monitored electrical means has experienced a current flow of a magnitude at least equal to a preselected maximum or high magnitude.

Now let it be assumed that the monitored current has decreased to a value slightly less than the said preselected maximum or high magnitude. At the instant that the magnitude of the current thusly decreases, HALL effect means 362 will be turned "off" thereby bring the base 376 of transistor 370 effectively to the same potential as emitter 372 resulting in transistor 370 being turned "off" and terminating conduction. However, since the assumed current did not decrease to a magnitude equal to or less than a preselected minimum or low magnitude, HALL effect means 360 will still remain "on".

Consequently, at this time or state of operation, the input signals at input terminals 70f and 72f become "low" resulting in output signal of gate 12f being "high" which, in turn, is applied to input terminal 56f of gate 14f; such a "high" signal along with the input signal on input terminal 58f which remains "high" causes the resulting signal at output terminal 76f to be "low". Consequently, the signal at both input terminals 78f and 80f of gate 16f are "low" resulting in the signal at output terminal 96f of gate 16f being "high" which, applied to both input terminals 98f and 100f of gate 18f causes the signal at output terminal 108f to be "low". The "low" output signal applied to the gate or base terminal 114f of transistor 116f causes the transistor 116f to be taken out of conduction, turned "off", resulting in the de-energization of indicator means 142f. The de-energization of the indicator means 142f, under the assumed conditions, would indicate that the magnitude of the monitored current is within a preselected acceptable range of magnitudes.

Now let it be assumed that the magnitude of the monitored current decreases and finally attains a magnitude equal to or less than a preselected minimum or low magnitude. At the instant that the magnitude of the monitored current decreases to the preselected minimum or low magnitude, HALL effect means 360 turns "off", while HALL effect means 362, which was in an "off" state, remains "off". Therefore, base 394 of transistor 388 is effectively brought to the same potential as emitter 390 which results in transistor 388 being taken out of conduction and turned "off" resulting in the input signal at input terminal 58f of gate 14f being "low". At this time the input terminals 70f and 72f of gate 12f remain at a relatively "low" input signal thereby maintaining the signal at output of gate 12f at "high" which continues to be applied as a "high" input signal to input terminal 56f of gate 14f. As a result of gate input 58f being "low" and gate input 56f being "high" the signal at output terminal 76f of gate 14f now becomes "high".

The "high" output of gate 14f applied to both input terminals 78f and 80f of gate 16f causes the signal at output terminal 96f of gate 16f to be "low" which, applied to both input terminals 98f and 100f of gate 18f, causes the output at 108f of gate 18f to be "high". As previously described, the "high" output at 108f, applied to base terminal 114f, causes transistor 116f to be turned "on" thereby energizing the indicator means 142f which will continue to be energized for as long as the assumed under-current condition exists.

As should be apparent, the invention of FIG. 9 is capable of sensing and responding to three different states or operating conditions. That is, the first condition is that which may be referred to as a normal or acceptable range of magnitudes of monitored current; the second condition is that which may be referred to as a range of magnitudes of monitored current in excess of the acceptable range; and the third condition is that which may be referred to as a range of magnitudes of monitored current less than the acceptable range.

In the preferred arrangement of the embodiment of FIG. 9, the time delay means, as comprised of, for example, resistor means 84f and capacitor means 92f, is also provided. The operation of such is as previously described with regard to the embodiment of FIG. 1.

As also depicted in FIG. 9, auxiliary switching means may be provided as to, for example, open power supply circuit means leading to related electrical load means 406. Such may be accomplished as by employing, for example, switching means as depicted in FIG. 8. Elements of such switching means in FIG. 9 like or functionally similar to those of FIG. 8 are identified with like reference numerals and, where applicable, like suffixes. The operation thereof is, of course, as disclosed with reference to FIG. 8 (and FIG. 7).

Figure 10:
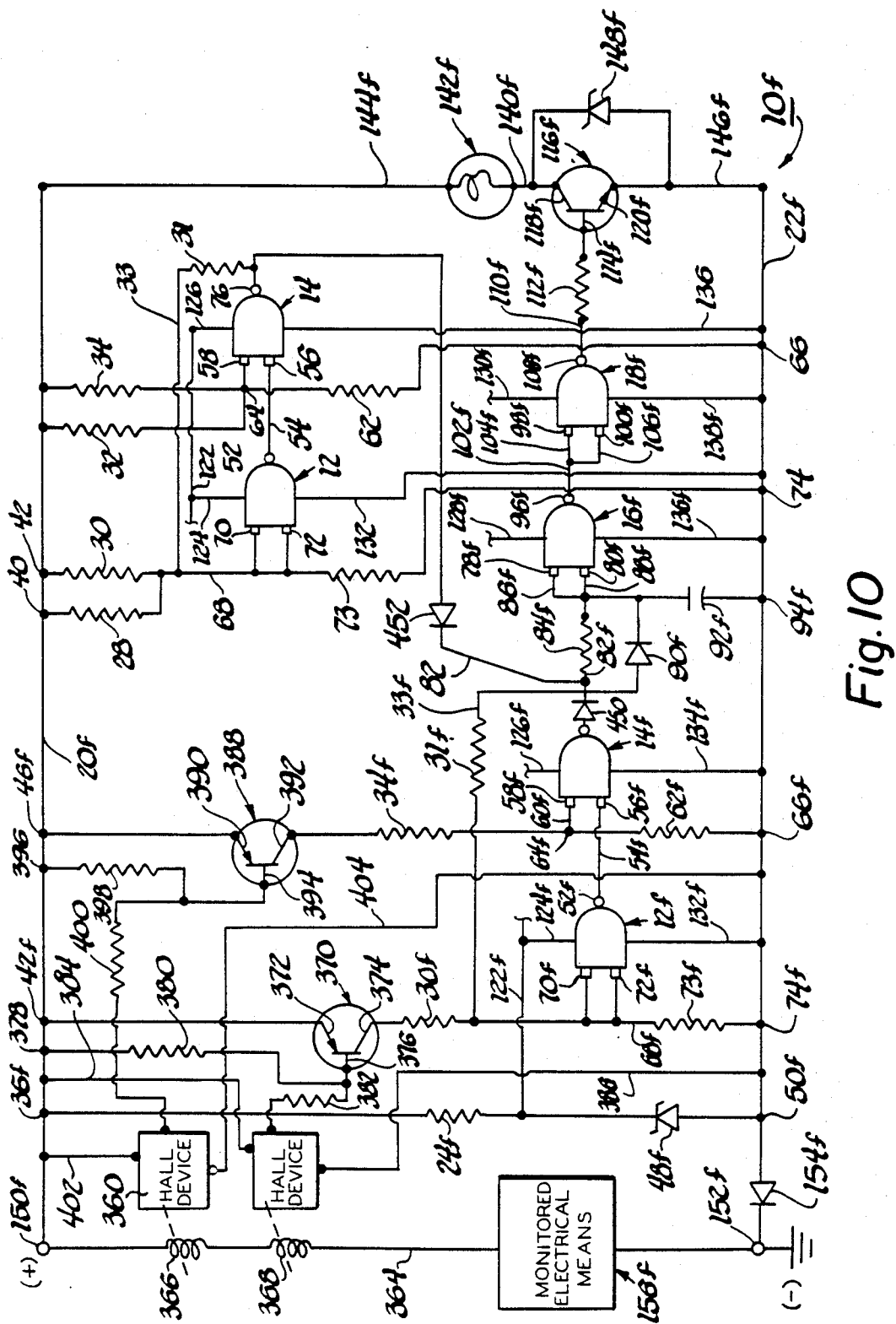
FIG. 10 is a schematic wiring diagram illustrating yet other apparatus employing teachings of the invention.

FIG. 10 illustrates another embodiment of the invention. A review of the schematic wiring diagram of FIG. 10 will disclose (with the exception of the switching means leading to associated load 406 of FIG. 9) that it corresponds to the circuity of FIG. 9 and, further, all such corresponding elements in FIG. 10 are identified with reference numerals and suffixes corresponding to those in FIG. 9. Also, FIG. 10 comprises a portion of the circuitry disclosed in FIG. 1. All such elements in FIG. 10 which correspond to those of FIG. 1 are identified with reference numerals corresponding to those in FIG. 1.

The operation of that portion of the circuitry of FIG. 10 which corresponds to the circuitry of FIG. 9 is, of course, the same as that described with reference to FIG. 9 while the operation of that portion of the circuitry of FIG. 10 which corresponds to the circuitry of FIG. 1 is, of course, the same as that described with reference to FIG. 1. That is, not only is the circuitry of FIG. 10 capable of sensing and responding to three different conditions of magnitudes of current flow, it is also capable of also sensing and responding to three different conditions of magnitudes of voltage. This becomes even more apparent when one considers that gate 16*f* is not really logically aware of the actual source of the input signals applied thereto. Therefore, regardless of whether gate 14*f* or gate 14 is the one which produces a "high" output signal (as previously described) gate 16*f* will respond in the same manner ultimately causing transistor 116*f* to be turned "on". Gates 12*f* and 14*f*, of course, produce their signals in response to monitored current while gates 12 and 14 produce their signals in response to monitored voltage. Preferably, diodes 450 and 452 are provided in order to prevent any possible reverse current flow as from gates 12 and 14 through gates 14*f* and 12*f* and vice versa. If it is desired, additional switching means such as that illustrated in FIG. 9 in association with the load 406 may be added to the circuitry of FIG. 10 as, for example, in the manner disclosed in FIG. 9. Of course, other suitable switching means could be employed as well as a plurality of such additional switching means for opening and/or closing of related generally external load circuits.

By way of further background the quad 2-input "NAND" gate, as represented by gates 12, 14, 16 and 18 of FIG. 1, was connected in a manner whereby terminals 70,72,52,58,56,76,78,80,96,98,100 and 108 respectively correspond to "pins" or terminals 6,5,4,1,2,3,8,9,10,12,13, and 11 as depicted as in the said publication "The Semiconductor Data Library, Series A, Volume V".

Various HALL effect devices or means are well known and commercially available. In the preferred embodiment, primarily for convenience, HALL devices 360 and 362 would each comprise integrated circuit type HALL effect switching devices. Some of such have been disclosed as in the publication "Engineering Bulletin 27404.11" of the Semiconductor Division of Sprague Electric Company of Pembroke Road, Concord, N.H. and bearing a United States of America copyright notice of 1977 by the Sprague Electric Company of Massachusetts. The said "Engineering Bulletin 27404.11" also illustrates typical functional block diagrams of such integrated circuit HALL effect switches.

Although only a preferred embodiment and selected modifications of the invention have been disclosed and described it is apparent that other embodiments and modifications of the invention are possible within the scope of the appended claims.

What is claimed is:

1. The combination of a combustion engine, electric storage battery means, electrically powered starter motor means for at times driving said engine in order to start said engine, engine ignition means, operator positionable first electrical switch means, second electrical switch means closable upon electrical energization thereof, first electrical circuit means electrically interconnecting said battery means and said first electrical switch means, second electrical circuit means interconnecting said battery means and said starter motor means, said second electrical switch means when closed being effective to electrically close said second electrical circuit means through said starter motor means in order to thereby electrically power said starting motor means for driving said engine, first electrical contact means, third electrical circuit means electrically interconnecting said second switch means with said first electrical contact means, second electrical contact means, fourth electrical circuit means interconnecting said engine ignition means with said second electrical contact means, third electrical contact means, electrical system monitoring means, fifth electrical circuit means electrically interconnecting a first portion of said monitoring means to said third electrical contact means, and sixth electrical circuit means electrically interconnecting a second portion of said monitoring means to said battery means, said first electrical switch means when positioned as to be in electrical contact with said first electrical contact means being effective to electrically energize said second electrical switch means, said first electrical switch means being effective when positioned as to be in electrical contact with said second electrical contact means to electrically close said fourth electrical circuit means through said engine ignition means, said first electrical switch means being effective when positioned as to be in electrical contact with said third electrical contact means to electrically close said fifth and sixth electrical circuit means through said monitoring means, said monitoring means comprising means for sensing the actual voltage as across said battery means said first electrical circuit means and said first electrical switch means, said monitoring means further comprising output load means and third electrical switch means for controlling the energization and deenergization of said output load means, said means for sensing the actual voltage being effective upon sensing either a preselected high magnitude of said actual voltage or a preselected low magnitude of said actual voltage for actuating said third electrical switch means, said means for sensing the actual voltage comprising voltage divider means and NAND gate means, said NAND gate means comprising first second third and fourth gate means, said first gate means being effective upon the occurrence of said relatively high magnitude of actual voltage for producing and applying a first low signal to said second gate means for in turn causing said second gate means to produce and apply a high signal to said third gate means, said third gate means upon application thereto of said high signal being effective for producing and applying a low signal to said fourth gate means thereby causing said fourth gate means to produce a high output signal and apply such output signal to said third electrical switch means for actuation thereof.

2. The combination according to claim 1 wherein said third electrical switch means is closed by the application thereto of said high output signal.

3. The combination according to claim 1 wherein said voltage divider means comprises first voltage divider means and second voltage divider means, wherein said first voltage divider means is electrically connected to said first gate means, and wherein said second voltage divider means is electrically connected to said second gate means.

4. The combination according to claim 1 and further comprising time delay means effective for delaying de-actuation of said third electrical switch means upon said actual voltage changing in magnitude from a magnitude equal to or greater than said preselected high magnitude to a magnitude less than said preselected high magnitude, said time delay means comprising an R-C network electrically connected to and between said second and third gate means.

5. The combination of a combustion engine, electric storage battery means, electrically powered starter motor means for at times driving said engine in order to start said engine, engine ignition means, operator positionable first electrical switch means, second electrical switch means closable upon electrical energization thereof, first electrical circuit means electrically interconnecting said battery means and said first electrical switch means, second electrical circuit means interconnecting said battery means and said starter motor means, said second electrical switch means when closed being effective to electrically close said second electrical circuit means through said starter motor means in order to thereby electrically power said starting motor means for driving said engine, first electrical contact means, third electrical circuit means electrically interconnecting said second switch means with said first electrical contact means, second electrical contact means, fourth electrical circuit means interconnecting said engine ignition means with said second electrical contact means, third electrical contact means, electrical system monitoring means, fifth electrical circuit means electrically interconnecting a first portion of said monitoring means to said third electrical contact means, sixth electrical circuit means electrically interconnecting a second portion of said monitoring means to said battery means, said first electrical switch means when positioned as to be in electrical contact with said first electrical contact means being effective to electrically energize said second electrical switch means, said first electrical switch means being effective when positioned as to be in electrical contact with said second electrical contact means to electrically close said fourth electrical circuit means through said engine ignition means, said first electrical switch means being effective when positioned as to be in electrical contact with said third electrical contact means to electrically close said fifth and sixth electrical circuit means through said monitoring means, said monitoring means comprising means for sensing the actual voltage as across said battery means said first electrical circuit means and said first electrical switch means, said monitoring means further comprising output load means and third electrical switch means for controlling the energization and deenergization of said output load means, said means for sensing the actual voltage being effective upon sensing either a preselected high magnitude of said actual voltage or a preselected low magnitude of said actual voltage for actuating said third electrical switch means, current monitoring means, said current monitoring means comprising current flow sensing means effective for sensing the magnitude of said monitored current through said battery means said first electrical circuit means and creating an output signal in response thereto, and means responsive to said output signal and effective upon said output signal indicating the existance of a preselected high magnitude or a preselected low magnitude of monitored current for actuating said third electrical switch means, said current flow sensing means comprising HALL effect means, solid state switch means, and voltage divider means, said solid state switch means being in circuit with said voltage divider means for electrically opening and closing said voltage divider means, and said HALL effect means being effective for actuating said solid state switch means.

6. The combination of a combustion engine, electric storage battery means, electrically powered starter motor means for at times driving said engine in order to start said engine, engine ignition means, operator positionable first electrical switch means, second electrical switch means closable upon electrical energization thereof, first electrical circuit means electrically interconnecting said battery means and said first electrical switch means, second electrical circuit means interconnecting said battery means and said starter motor means, said second switch means when closed being effective to electrically close said second electrical circuit means through said starter motor means in order to thereby electrically power said starting motor means for driving said engine, first electrical contact means, third electrical circuit means electrically interconnecting said second switch means with said first electrical contact means, second electrical contact means, fourth electrical circuit means interconnecting said engine ignition means with said second electrical contact means, electrical system monitoring means, fifth electrical circuit means electrically interconnecting said battery means to a first portion of said monitoring means, and sixth electrical circuit means electrically interconnecting a second portion of said monitoring means to said fourth electrical circuit means, said first electrical switch means when positioned as to be in electrical contact with said second electrical contact means being effective to electrically close said fourth electrical circuit means through said engine ignition means and electrically close said fifth and sixth electrical circuit means through said monitoring means, said monitoring means comprising means for sensing the actual voltage as across said battery means said first electrical circuit means and said first electrical switch means, said monitoring means further comprising electrical output load means and third electrical switch means for controlling the energization and deenergization of said load means, said means for sensing the actual voltage being effective upon sensing either a preselected high magnitude of actual voltage or a preselected low magnitude of actual voltage for actuating said third electrical switch means, said means for sensing the actual voltage comprising voltage divider means and NAND gate means, said NAND gate means comprising first second third and fourth gate means, said first gate means being effective upon the occurrence of said high magnitude of actual voltage for producing and applying a first low signal to said second gate means for in turn causing said second gate means to produce and apply a high signal to said third gate means, said third gate means upon application thereto of said high signal being effective for producing and applying a low signal to said fourth gate means thereby causing said fourth gate means to produce a high output signal and apply such output signal to said third electrical switch means for actuation thereof.

7. The combination according to claim 6 wherein said third electrical switch means is closed by the application thereto of said high output signal.

8. The combination according to claim 6 wherein said voltage divider means comprises first voltage divider means and second voltage divider means, wherein said first voltage divider means is electrically connected to said first gate means, and wherein said second voltage divider means is electrically connected to said second gate means.

9. The combination according to claim 6 and further comprising time delay means effective for delaying de-actuation of said third electrical switch means upon said actual voltage changing in magnitude from a magnitude equal to or greater than said preselected high magnitude to a magnitude less than said preselected high magnitude, said time delay means comprising an R-C network electrically connected to and between said second and third gate means.

10. The combination of a combustion engine, electric storage battery means, electrically powered starter motor means for at times driving said engine in order to start said engine, engine ignition means, operator positionable first electrical switch means, second electrical switch means closable upon electrical energization thereof, first electrical circuit means electrically interconnecting said battery means and said first electrical switch means, second electrical circuit means interconnecting said battery means and said starter motor means, said second switch means when closed being effective to electrically close said second electrical circuit means through said starter motor means in order to thereby electrically power said starting motor means for driving said engine, first electrical contact means, third electrical circuit means electrically interconnecting said second switch means with said first electrical contact means, second electrical contact means, fourth electrical circuit means interconnecting said engine ignition means with said second electrical contact means, electrical system monitoring means, fifth electrical circuit means electrically interconnecting said battery means to a first portion of said monitoring means, sixth electrical circuit means electrically interconnecting a second portion of said monitoring means to said fourth electrical circuit means, said first electrical switch means when positioned as to be in electrical contact with said second electrical contact means being effective to electrically close said fourth electrical circuit means through said engine ignition means and electrically close said fifth and sixth electrical circuit means through said monitoring means, said monitoring means comprising means for sensing the actual voltage as across said battery means said first electrical circuit means and said first electrical switch means, said monitoring means further comprising electrical output load means and third electrical switch means for controlling the energization and deenergization of said load means, said means for sensing the actual voltage being effective upon sensing either a preselected high magnitude of actual voltage or a preselected low magnitude of actual voltage for actuating said third electrical switch means, current monitoring means, said current monitoring means comprising current flow sensing means effective for sensing the magnitude of said monitored current through said battery means said first electrical circuit means and creating an output signal in response thereto, and means responsive to said output signal and effective upon said output signal indicating the existance of a preselected high magnitude or a preselected low magnitude of monitored current flow for actuating said third electrical switch means, said current flow sensing means comprising HALL effect means, solid state switch means, said voltage divider means, said solid state switch means being in circuit with said voltage divider means for electrically opening and closing said voltage divider means, and said HALL effect means being effective for actuating said solid state switch means.

* * * * *